Jan. 18, 1938.　　　A. B. WERDEHOFF　　　2,105,713
FRAME
Filed March 23, 1935

INVENTOR.
Albert B. Werdehoff.
BY
Harness, Dind, Patee & Harris
ATTORNEYS.

Patented Jan. 18, 1938

2,105,713

UNITED STATES PATENT OFFICE 2,105,713

FRAME

Albert B. Werdehoff, Lake Orion, Mich., assignor to Chrysler Corporation, Highland Park, Mich., a corporation of Delaware Application March 23, 1935, Serial No. 12,577

10 Claims. (Cl. 280—106)

This invention relates to motor vehicles and refers more particularly to frame structures employed in such vehicles, either as a chassis frame adapted to receive the vehicle engine body structure or as a frame adapted to be built into the body structure as a unit.

In motor vehicle frame structures employing rail members such as the side longitudinally extending rails, it is desirable to maintain a substantially uniform rail cross-section along its length, especially with the more desirable types of rail structures such as the "box" or other hollow type, for example, since such uniform section may be readily rolled at a minimum of cost when kept uniform in its section. I mention the box type of frame since a frame element of such type affords the desired high degree of stiffness and lightness of weight in the broader aspects of my invention, other forms of hollow rails may be employed if desired.

Since the frame structure and its component elements are subjected to stresses, usually bending stresses, of varying intensity along the length thereof, it is necessary to provide the frame elements with sufficient rigidity at its point of greatest stress. However, if the section of the frame element is maintained uniform, then this requires a section which is excessively heavy at other points, usually at the ends.

It is an object of my invention to provide a frame structure or rail element thereof which may be made of uniform section throughout its length and at the same time providing a simple and inexpensive reinforcing structure at the points of maximum stress, the reinforced rail being preferably of the aforesaid box type to provide the desired high degree of rigidity for the weight of material used. My reinforcing structure is of a character affording great strength for the total weight of materials involved.

A further object of my invention is to provide an improved frame reinforcing structure which is of a self locating nature when applied to the frame rail, thereby facilitating the assembly process of the reinforcing member with the frame rail.

Further objects and advantages of my invention will be more apparent as this specification progresses, reference being made to the accompanying drawing illustrative of one embodiment of the principles of my invention and in which.

Figure 1:
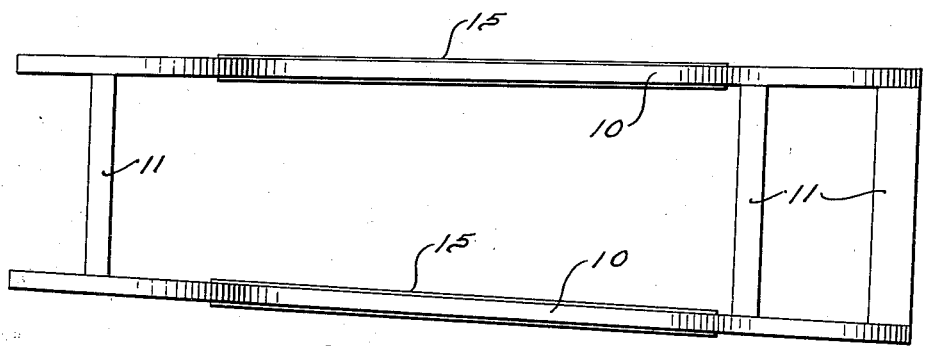
Fig. 1 is a top plan view of the assembled frame structure.
Figure 2:
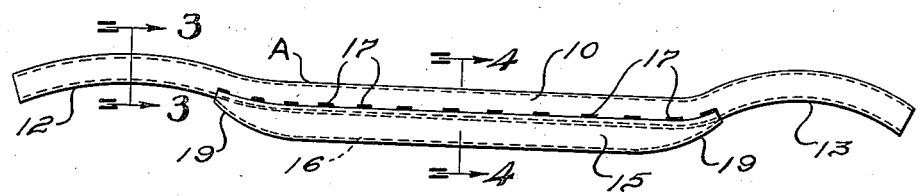
Fig. 2 is a side elevational view thereof.
Figure 3:
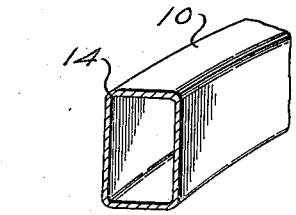
Figure 4:
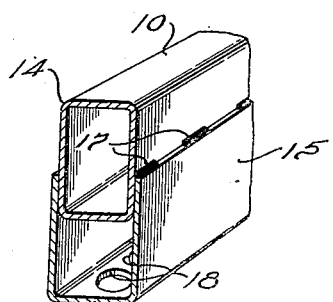

Figs. 3 and 4 are detail sectional perspective views along a reinforced frame rail, the sections being taken at lines 3—3 and 4—4 respectively of Fig. 2.

Figure 5:
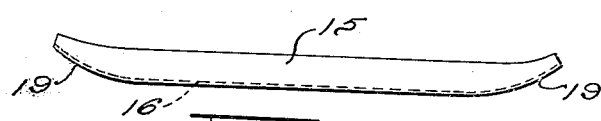

Fig. 5 is a side elevational view of my reinforcing member.

In the drawings I have illustrated my frame structure A comprising the longitudinally extending side rails or sills 10 and the connecting cross members 11 of any desired form and arrangement. For illustrating my invention I have shown frame A as the well known chassis type having the usual front and rear kick-up portions 12 and 13, although such frame may constitute a part of the motor vehicle body structure if desired.

Rails 10 are preferably of the box type and may be formed by rolling the steel tube-like and welding longitudinally at a corner 14 although other methods of fabrication may be employed if desired as I do not claim such fabrication method per se as a part of my said invention. If desired, the frame members or elements 10 and 11 may be fabricated or built up with a plurality of separate channels. In any event, these members may be regarded as elements of the frame structure.

Secured to each rail 10, preferably by welding thereto, is my channeled reinforcing member 15 which is preferably U-shaped in cross section for maximum strength and lightness of weight. The member 15 is preferably secured to a rail 10 below the latter with the web 16 spaced from rail 10 to provide a relatively deep light section of great rigidity. The side flanges of member 15 extend upwardly and overlap the lower side portions of rail 10 in engagement therewith, the reinforcing member being welded to rail 10 as indicated at 17.

In order to lighten the weight of the reinforcing member 15, the web 16 thereof is preferably formed with a series of perforations 18 of any suitable shape. The perforations in web 16 do not appreciably lessen the rigidity of the frame structure.

The ends of the reinforcing member 15 are preferably tapered at 19, the web 16 curving toward rail. Thus, when member 15 is applied to the rail, these tapered ends engage the rail and thus provide locating means or stops whereby the reinforcing member is easily and properly applied for the welding attachment to the rail. In the frame illustrated, the tapered ends 19 fit rail 10 adjacent the inner portions of the kick-up portions 12 and 13. It will be apparent that a frame of any desired localized rigidity may be provided by varying the depth of the attaching member 15, for example, while using the same rail 10. This facilitates the manufacture of a series of frames of differing strength characteristics while reducing the number and cost of component parts necessary for the manufacture of such frames. The strength properties imparted by the reinforcing member 15 may also be varied by altering the angle of taper 19, where this feature of my invention is desired, it being apparent that the less the taper of a given member 15 the less will be the depth of the reinforced rail section since the rail 10 will be further nested in the member 15.

I claim:

1. In a motor vehicle frame structure, a frame element of substantially rectangular box-like cross-section, and a reinforcing member substantially U-shaped in cross-section rigidly secured to said frame element and having side flanges depending therebelow, the lower wall of said frame element connecting the side flanges of said reinforcing member.

2. In a motor vehicle frame structure, a frame element of substantially rectangular cross-section, and a reinforcing member substantially U-shaped in cross-section rigidly secured to said frame element with the side walls of said reinforcing member engaging opposite sides of said frame element.

3. In a motor vehicle frame structure, a frame element of substantially uniform rectangular cross-section throughout its length, and a reinforcing member substantially U-shaped in cross-section rigidly secured to said frame element and extending longitudinally thereof with portions of the side walls of said U-shaped member engaging portions of opposite sides of said frame element, the engaged portions of said frame element extending within said side wall portions of said U-shaped member.

4. In a motor vehicle frame structure, a frame element of substantially rectangular cross-section, and a reinforcing member substantially U-shaped in cross-section rigidly secured to said frame element, the side flanges of said reinforcing member depending downwardly from said frame element, said reinforcing member having a web spaced from said frame element and provided with a series of weight-reducing perforations.

5. In a motor vehicle frame structure, a hollow frame member, and a reinforcing member for stiffening said frame member, said reinforcing member being welded to said frame member and extending downwardly therefrom, said reinforcing member providing a hollow beam one wall of which is formed by said frame member.

6. In a motor vehicle frame structure, a hollow frame member, and a reinforcing member for stiffening said frame member, said reinforcing member being welded to said frame member and extending downwardly therefrom, said reinforcing member having a web portion spaced from said frame member intermediate the length thereof, said web portion being deflected toward and into engagement with said frame member at one end thereof.

7. In a motor vehicle chassis frame, transversely spaced longitudinally extending hollow side rails of substantially uniform cross-section throughout their lengths, and means for stiffening intermediate portions of each of said side rails comprising a channeled reinforcing member vertically overlapping the lower portion of each of said intermediate portions of said side rails and welded thereto.

8. In a motor vehicle chassis frame, transversely spaced longitudinally extending hollow side rails of substantially uniform cross-section throughout their lengths, and means for stiffening intermediate portions of each of said side rails comprising a channeled reinforcing member vertically overlapping the lower portion of each of said intermediate portions of said side rails and welded thereto, each of said channeled members having a web portion spaced below an associated side rail.

9. In a motor vehicle chassis frame, transversely spaced longitudinally extending hollow side rails of substantially uniform cross-section throughout their lengths, and means for stiffening intermediate portions of each of said side rails comprising a channeled reinforcing member vertically overlapping the lower portion of each of said intermediate portions of said side rails and welded thereto, the ends of said channeled members curving upwardly toward said rails respectively whereby to limit said overlap during assembly of said members on said rails.

10. In a motor vehicle frame structure, a frame element having a downwardly extending side wall, and a reinforcing member for stiffening said frame element, said reinforcing member having a side wall overlapping the lower edge of the side wall of said frame element and rigidly secured thereto, said reinforcing member further having a bottom web extending laterally from the lower edge of its said side wall, opposite end portions of said web being deflected toward the bottom of said frame element for engagement therewith and so constructed and arranged as to locate said reinforcing member with said frame element.

ALBERT B. WERDEHOFF.